United States Patent
Ye (10) Patent No.: US 7,675,884 B2
(45) Date of Patent: Mar. 9, 2010

(54) APPARATUS AND METHOD FOR COMMUNICATION SCHEDULING IN A WIRELESS SENSOR NETWORK

(75) Inventor: Kyung-wook Ye, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 568 days.

(21) Appl. No.: 11/580,166

(22) Filed: Oct. 13, 2006

(65) Prior Publication Data

US 2007/0086341 A1 Apr. 19, 2007

Related U.S. Application Data

(60) Provisional application No. 60/725,663, filed on Oct. 13, 2005.

(30) Foreign Application Priority Data

Jun. 27, 2006 (KR) ...................... 10-2006-0058215

(51) Int. Cl.
*H04W 4/00* (2009.01)
*H04J 3/00* (2006.01)

(52) U.S. Cl. ...................... 370/329; 370/328; 370/330; 370/336; 370/338

(58) Field of Classification Search ................. 370/337, 370/338, 347, 445

See application file for complete search history.

(56) References Cited

U.S. PATENT DOCUMENTS 6,363,062 B1 3/2002 Aaronson et al.
6,975,613 B1* 12/2005 Johansson .................... 370/338
2005/0152291 A1* 7/2005 Al-Harthi .................... 370/277

FOREIGN PATENT DOCUMENTS

CN 1408157 A 4/2003
JP 2002-342264 A 11/2002
JP 2003-501941 A 1/2003

* cited by examiner

*Primary Examiner*—Dwayne Bost
*Assistant Examiner*—Larry Sternbane
(74) *Attorney, Agent, or Firm*—Sughrue Mion, PLLC (57) ABSTRACT

An apparatus and method are provided for communication scheduling. The apparatus includes a control unit for determining whether a reference node and a plurality of child nodes of the reference node have completed communication scheduling, which is required for performing communication between the reference node and the child nodes during a time period, based on the reference node; and a scheduling unit for performing the communication scheduling between the reference node and a parent node of the reference node by selecting a communication time, when the communication scheduling between the reference node and the child nodes have been completed.

10 Claims, 9 Drawing Sheets

701  RTS(C->B)

702  CTS(B->C)

703  ACK(C->B)

FIG. 7B

704  WTS(D->B)

705  WTS(E->B)

APPARATUS AND METHOD FOR COMMUNICATION SCHEDULING IN A WIRELESS SENSOR NETWORK

CROSS-REFERENCE TO RELATED APPLICATION

This application claims priority from Korean Patent Application No. 10-2006-0058215 filed on Jun. 27, 2006 in the Korean Intellectual Property Office, and U.S. Provisional Patent Application No. 60/725,663 filed on Oct. 13, 2005 in the United States Patent and Trademark Office, the disclosures of which are incorporated herein by reference in their entirety.

BACKGROUND OF THE INVENTION

1. Field of the Invention

Apparatuses and methods consistent with the present invention relate to communication scheduling, and more particularly, to communication scheduling which efficiently transmits/receives control packets required for communication scheduling among nodes.

2. Description of the Related Art

With technological advancements made in sensors, Micro Electro Mechanical Systems (MEMS), low-power electronics, and low-power radio frequency (RF) design, low-priced and low-power miniature sensor nodes capable of being connected through a wireless network have been developed. The sensor nodes include sensing, data processing, and communication components. A great number of sensor nodes may be densely deployed in very close areas so as to form a wireless sensor network, which can be applied to various fields, including military, home networks, environment monitoring, factory management, disaster monitoring, etc. Since it is not required to predetermine the positions of sensor nodes in the sensor network, the sensor nodes can be deployed according to necessity for applications in an unapproachable area or disaster rescue situation. This is because a sensor network protocol has a self-organizing capability, and sensor nodes cooperate with each other.

In addition, a sensor network includes a sensor field, in which sensor nodes are deployed, and a sink which connects the sensor field to an external network. That is, data collected in the sensor field can be transported through the sink.

Figure 1:
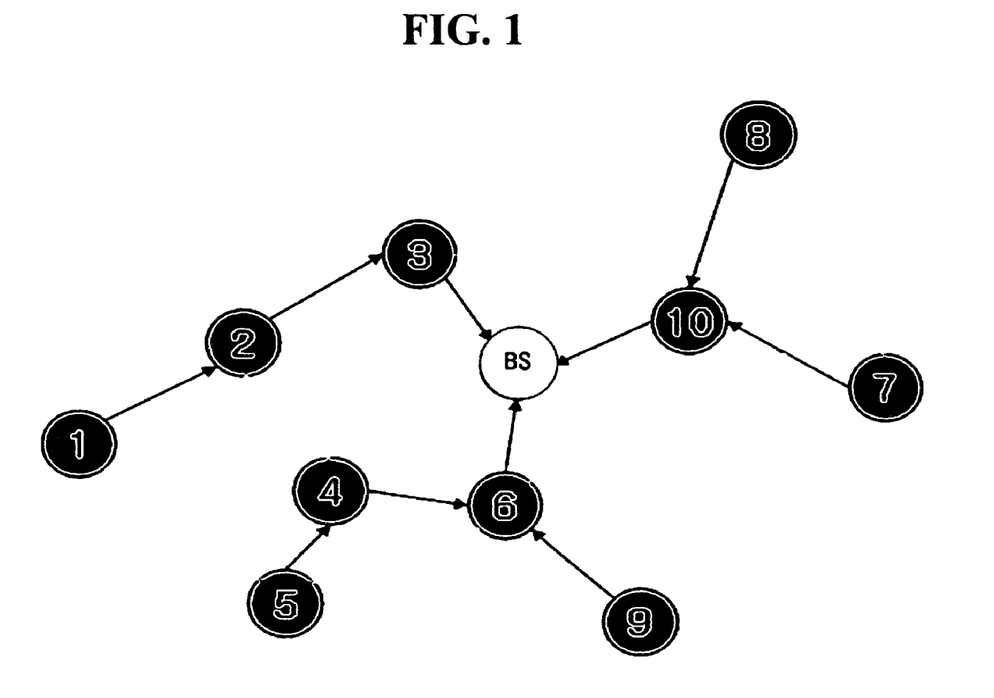
FIG. 1 is a conceptual view illustrating an example in which communication times are allocated to each node through cross-layer scheduling in a related art sensor network.

FIG. 1 is a conceptual view illustrating an example in which communication times are allocated to each node through cross-layer scheduling in a related art sensor network.

After sensor nodes have been deployed in a sensor field, a sink node, i.e., base station (BS), which finally collects information collected by the sensor nodes, floods interest query packets containing information about data to be collected by the sensor nodes. When the interest query packets have been flooded, a network topology with a tree structure is formed.

That is, when the sink node floods the interest query packets to all the sensor nodes, the sink node becomes a source node, and nodes #3, #6, and #10 become destination nodes. Thereafter, each of nodes #3, #6, and #10 transmits the received interest query packets to its neighboring sensor nodes. In this case, nodes #3, #6, and #10 become source nodes, and nodes #2, #4, #9, #7, and #8 become destination nodes. That is, the destination node of node #3 is node #2, the destination nodes of node #6 are nodes #4 and #9, and the destination nodes of node #10 are nodes #7 and #8. When the interest query packets have been continuously transmitted to an end node in the above manner, the tree structure connected by arrows, as shown in FIG. 1, is created.

Thereafter, nodes #1, #5, #9, #7, and #8, which are child nodes, transmit data collected by the respective child nodes to nodes #2, #4, #6, and #10, which are parent nodes thereof. Then, nodes #2, #4, #6, and #10 transmit data to their parent nodes, i.e., to node #3 and BS, and node #3 transmits data to the BS, so that the BS can collect the data.

Therefore, communication scheduling to the sink node (BS) is completed by successively performing the communication scheduling with respect to corresponding parent nodes from the lowest-stage child nodes in the tree structure, so that data collected by the sensor nodes can be efficiently transmitted to the sink node (BS).

Meanwhile, cross-layer scheduling is constructed with a Request To Send (RTS) packet transmitted from a source node to a destination node, a Clear To Send (CTS) packet used by a destination node in order to notify a source node that the destination node has received an RTS packet, a Route SETUP (RSETUP) packet used by a source node in order to notify a destination node of a communication time period representing how much time the source node will need to transmit actual data packets, and an acknowledgement (ACK) packet used by a destination node in order to notify a source node that communication scheduling has been determined.

The cross-layer scheduling includes determining communication time and transmitting a packet according to the determined communication time. The communication time determination is performed only once after nodes have been deployed in a area. In the communication time determination, the nodes use control packets (i.e., RTS, CTS, RSETUP, and ACK packets) in order to make out communication scheduling for communication time. In the cross-layer scheduling, the communication scheduling starts from the lowest-stage node in the topology, since most of the packets must be transmitted to a sink node in an actual sensor network. A more detailed description of the cross-layer scheduling is disclosed in "Cross-Layer Scheduling for Power Efficiency in Wireless Sensor; M. L. Sichitiu".

A source node, which wants to establish the communication scheduling, sets a node corresponding to its own next hop as a destination node, and transmits an RTS packet to the destination node. The RTS packet transmitted by the source node includes a time value (i.e., time-stamp value) at which the RTS packet is transmitted. The time-stamp value represents a communication start time for transmission of an actual data packet. When the destination node of the RTS packet has successfully received the RTS packet, the destination node transmits a CTS packet to the source node in response to the reception of the RTS packet. After receiving the CTS packet, the source node transmits an RSETUP packet, which includes communication time information about how much time the source node will need to transmit packets, to the destination node. After successfully receiving the RSETUP packet, the destination node determines the communication scheduling based on a time period recorded in the RSETUP packet and the time at which the RTS packet was transmitted.

Thereafter, the destination node transmits an ACK packet to the source node, thereby notifying the source node that the communication scheduling has been determined based on the time period recorded in the RSETUP packet and the time point at which the RTS packet was transmitted. Through such a procedure, the communication scheduling is determined from the lowest-stage nodes to a sink node. After communication time for all nodes has been determined in the communication time determination, the nodes transmit actual data packets during a determined communication time period.

That is, a sensor node sets its own transceiver to receive or transmit so as to perform communication when it is time for the sensor node to communicate, and the sensor node maintains its own transceiver in a sleep state so as to save its power when not communicating.

However, when the RTS packet cannot be normally received by a corresponding destination node because a plurality of sensor nodes try to simultaneously transmit RTS packets within a range in which their communication may interfere with each other, or because a hidden node terminal exists, it is impossible to use the time point of the RTS packet transmission in a section for actual data communication. When the RTS packet has not been transmitted or received normally, the source node re-transmits the RTS packet. Repetition of such re-transmissions, causes the sensor node to consume, power unnecessarily.

Also, when a packet loss occurs during the transmission or reception procedure of the control packets (i.e., RTS, CTS, RSETUP, and ACK packets), the transmission or reception procedure must be performed again from the first step of transmitting the RTS packet, thereby unnecessarily consuming more power.

In addition, in the case in which a sensor node is an intermediate node of a routing path, if an RTS packet was lost during a communication scheduling procedure between the intermediate node and a destination node, the intermediate node must again attempt to establish communication scheduling with the destination node after a period of time elapses, so that a time delay may occur when transmitting an actual data packet.

Therefore, a method which can prevent an unnecessary consumption of power due to re-transmission of a packet and reduce a delay time in packet transmission during the transmission or reception procedure of control packets, which are required for communication scheduling of sensor nodes in a sensor network has been developed.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides an apparatus and a method for communication scheduling which efficiently transmits and receives control packets required for communication scheduling among nodes.

According to an aspect of the present invention, there is provided an apparatus for communication scheduling, the apparatus including a control unit which determines whether a reference node and a plurality of child nodes of the reference node have completed communication scheduling, which is required for performing communication between the reference node and the child nodes during a time period, based on the reference node; and a scheduling unit which performs the communication scheduling between the reference node and a parent node of the reference node by selecting a communication time, when the communication scheduling between the reference node and the child nodes have been completed.

According to another aspect of the present invention, there is provided a method of communication scheduling, the method including determining whether a reference node and a plurality of child nodes of the reference node have completed communication scheduling, which is required for performing communication between the reference node and the child X nodes during a time period, based on the reference node; and performing the communication scheduling between the reference node and a parent node of the reference node by selecting a communication time, when the communication scheduling between the reference node and the child nodes have been completed.

BRIEF DESCRIPTION OF THE DRAWINGS

The above and other aspects of the present invention will be more apparent from the following detailed description of exemplary embodiments taken in conjunction with the accompanying drawings, in which.

DETAILED DESCRIPTION OF THE EXEMPLARY EMBODIMENTS

Advantages and features of the present invention, and methods for achieving them will be apparent to those skilled in the art from the detailed description of the exemplary embodiments together with the accompanying drawings. The scope of the present invention is not limited to the exemplary embodiments disclosed in the specification and the present invention can be realized in various types. The described present exemplary embodiments are presented only for completely disclosing the present invention and helping those skilled in the art to completely understand the scope of the present invention, and the present invention is defined by the scope of the claims. In the following description of exemplary embodiments of the present invention, the same drawing reference numerals are used for the same elements throughout.

Figure 2:
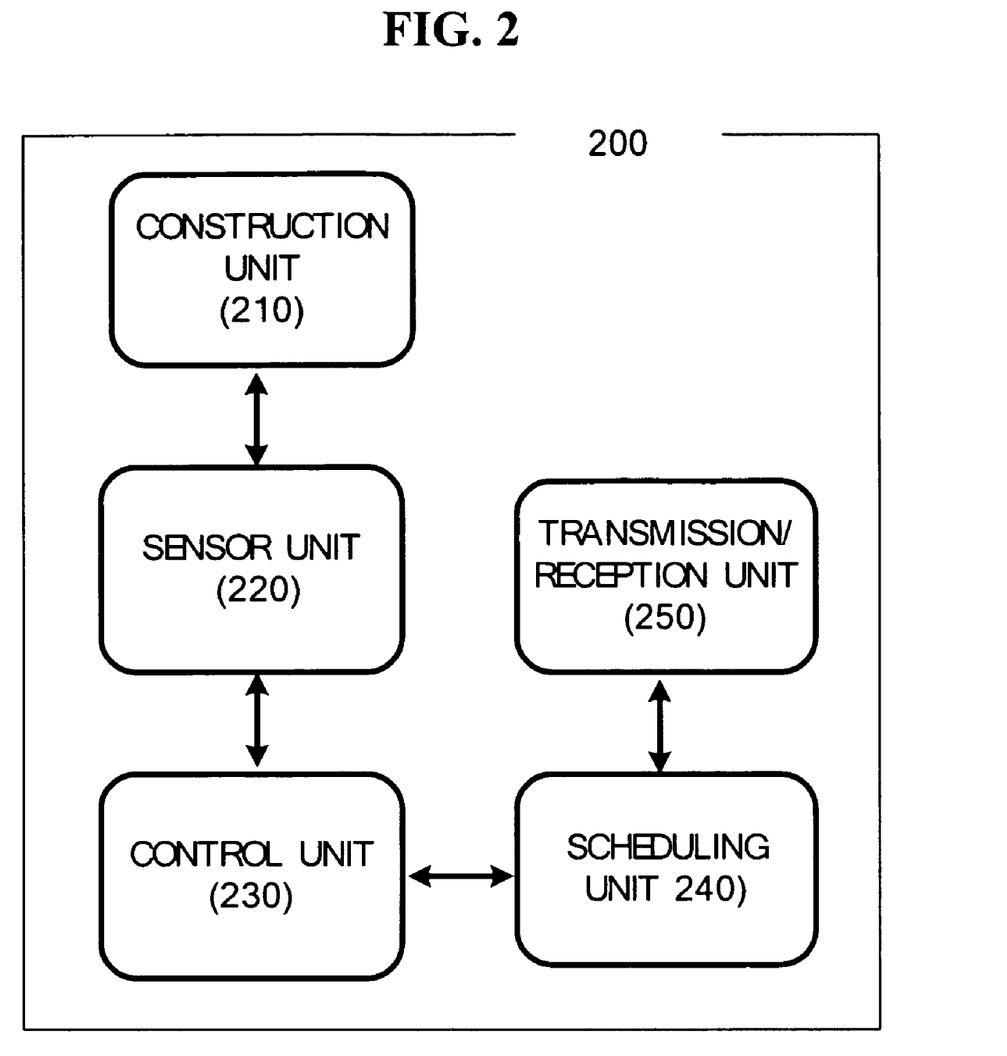
FIG. 2 is a block diagram illustrating the construction of a communication scheduling apparatus according to an exemplary embodiment of the present invention.

FIG. 2 is a block diagram illustrating the construction of a communication scheduling apparatus according to an exemplary embodiment of the present invention.

A communication scheduling apparatus 200 includes a construction unit 210, a sensor unit 220, a control unit 230, a scheduling unit 240, and a transmission/reception unit 250, in which the communication scheduling apparatus 200 may be included in a node.

The construction unit 210 constructs a bit string by concatenating a bit value allocated according to control packets of a reference node and a bit value representing a specific address of the reference node, in order to perform communication scheduling for communication between the reference node and a different node during a time period. Preferably, but not necessarily, a media access control (MAC) address of the reference address is used as the specific address of the reference node. The reference node can preoccupy media to transmit or receive a control packet by using the bit string.

In order to preoccupy the media, the construction unit 210 may prioritize control packets by using a bit value of a control packet included in the bit string. That is, the construction unit 210 may allocate a bit value of "001" to a Request To Send (RTS) packet, a bit value of "010" to a Clear To Send (CTS) packet, a bit value of "011" to a Wait To Send (WTS) packet, and a bit value of "100" to an ACK packet so that a higher bit value can have a higher priority. This enables rapid completion of communication scheduling between the reference node having preoccupied the media through the priority allocation and a different node, which will be described later in more detail with reference to FIGS. 5 to 7D.

Also, the construction unit 210 may establish time slot numbers for a communication time, at which a reference node and a different node can communicate, and insert the time slot numbers into a control packet. For example, when the entire data communication time is 100 msec and a unit time is 10 msec, a total of 10 time slots can be constructed. In this case, the construction unit 210 may sequentially allocate a plurality of time slot numbers to the time slots according to time sections, in such a manner that slot No. 1 is allocated to a time slot of 1 to 10 msec, slot No. 2 is allocated to a time slot of 11 to 20 msec, slot No. 3 is allocated to a time slot of 21 to 30 msec, etc. The time slot numbers representing a communication time between a reference node and a different node may be included in the control packets, i.e., in the RTS, CTS, and ACK packets.

The RTS packet may be a packet transmitted from a child node to a reference node, and the CTS packet may be a packet transmitted from the reference node in order to notify the child node that the reference node has received the RTS packet. The WTS packet may be a packet transmitted from a different child node, which is located at a level equal to that of the child node and has sensed the transmitted CTS packet, in order to notify the reference node that communication scheduling has not been established between the different child node and the reference node. The ACK packet may be a packet transmitted from a child node in order to notify the reference node that the child node has determined communication scheduling with the reference node.

The sensor unit 220 senses whether a reference node is transmitting a control packet to or receiving a control packet from a different node. For example, when a child node (second node) having preoccupied the media using a bit string transmits an RTS packet to a reference node (first node), and the first node having received the RTS packet transmits a CTS packet to the second node in response to the RTS packet, a child node (third node) with a level equal to that of the second node may sense the CTS packet, which has been transmitted from the first node to the second node, through the sensor unit 220. Then, the third node may transmit a WTS packet to the first node in order to notify the first node that communication scheduling has not yet been performed between the first node and the third node itself. In this case, if a Carrier Sense Multiple Access/ID Countdown (CSMA/IC) scheme is used, child nodes located within a range of two hops from the reference node can sense transmission or reception of the control packets.

Also, the reference node can sense, through the sensor unit 220, whether or not there is a bit value received from a different node.

The control unit 230 determines, on the basis of the reference node, whether or not a plurality of child nodes of the reference node have all completed communication scheduling for performing communication during a time period. According to an exemplary embodiment of the present invention in which the communication scheduling is performed based on a network topology of a tree structure, when the communication scheduling starts from a leaf node, the control unit 230 allows a node (i.e., reference node) to perform communication scheduling with respect to its parent node after all child nodes of the reference node have completed communication scheduling with respect to the reference node, thereby reducing the amount of control packets and the number of transmission times thereof. That is, a child node, which has not performed communication scheduling with respect to the reference node, may notify the control unit 230 that the child node itself has not yet performed communication scheduling with respect to the reference node by transmitting a WTS packet to the reference node.

The scheduling unit 240 performs the communication scheduling between the reference node and its parent node by selecting a communication time, after a plurality of child nodes of the reference node have all completed the communication scheduling with respect to the reference node. For example, when the scheduling unit 240 determines, through the control unit 230, that all child nodes of the reference node have completed the communication scheduling with respect to the reference node, the scheduling unit 240 reads time slot numbers representing communication times, which are included in ACK control packets received from the child nodes. Then, in a procedure of performing communication scheduling with respect to the parent node of the reference node by using the read time slot number, the scheduling unit 240 may select a time slot number capable of minimizing a transmission delay of a data packet, which includes information collected by the reference node, and transmit a control packet including the selected time slot number to the parent node of the reference node. The collected information may include various pieces of information, regarding for example, an area's temperature, electromagnetic waves, pollution level, location, topography, and objects, which have been collected in the area. After the communication scheduling has been completed, the reference node can transmit a data packet including the above-mentioned information to the base station (BS) in a communication time capable of minimizing a transmission delay.

That is, when communication scheduling has been completed between the reference node and its child nodes by using time slot Nos. 1, 2, and 3, the reference node may insert time slot Nos. 4 and 5, which are time sections available for communication of the reference node itself, into an RTS control packet, and transmit the RTS control packet to its parent node. Thereafter, the reference node transmits or receives control packets for performing communication scheduling to or from its parent node.

In this case, the scheduling unit 240 may function to compare communicable times between nodes (i.e., a parent node and a child node) and to select a time slot number available in common in order to perform communication scheduling. Preferably, but not necessarily, the scheduling unit 240 may select a time slot number capable of minimizing a transmission delay of a data packet which includes information collected by the reference node, which will be described later in more detail with reference to FIGS. 6A to 7D.

The transmission/reception unit 250 functions to transmit or receive data packets between nodes. That is, the transmission/reception unit 250 transmits or receives bit values according to place values of the bit string, and transmits or receives the control packets.

The respective component shown in FIG. 2 may be constructed as a "module". The term "module" includes, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionalities provided by the components and modules may be combined into fewer components and modules or further separated into additional components and modules.

Figure 3:
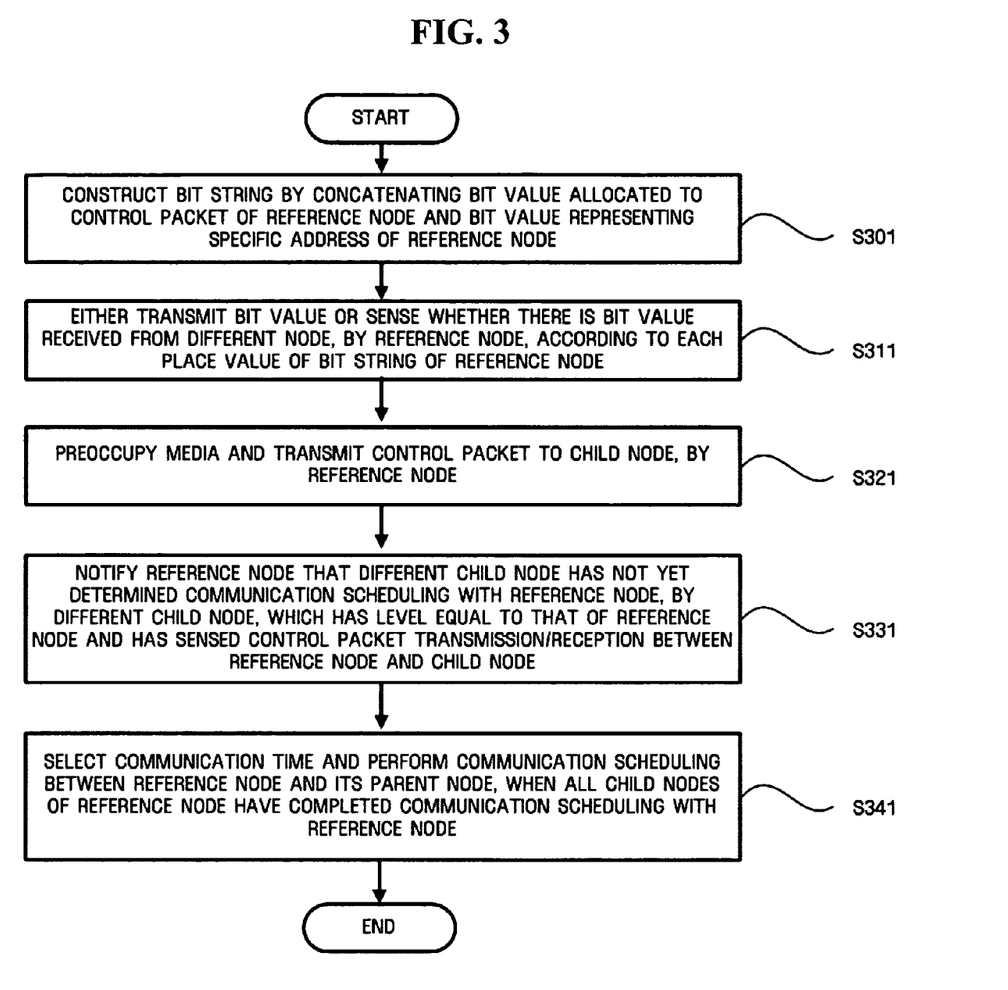
FIG. 3 is a flowchart illustrating a communication scheduling method using the communication scheduling apparatus shown in FIG. 2.

FIG. 3 is a flowchart illustrating a communication scheduling method using the communication scheduling apparatus shown in FIG. 2.

In the following description, construction and functions identical to those described with reference to FIG. 2 will be omitted, if possible, in order to avoid redundancy. The procedure for communication scheduling method will now be described. Hereinafter, it is assumed that a reference node acts as a parent node and performs communication scheduling with its own child nodes.

In operation 301, the construction unit 210 constructs a bit string by concatenating a bit value allocated according to each control packet of the reference node and a bit value representing a specific address of the reference node. In this case, the construction unit 210 can allocate priorities to the control packets by using bit values allocated according to the control packets. It is preferred, but not necessary, that a MAC address of the reference address is used as the specific address of the reference node. The reference node can preoccupy the media to transmit or receive a control packet by using the bit string. Also, the construction unit 210 may allocate a bit value of "001" to an RTS packet, a bit value of "010" to a CTS packet, a bit value of "011" to a WTS packet, and a bit value of "100" to an ACK packet so that a higher bit value can have a higher priority. Such priority allocation enables communication scheduling to be completed rapidly between the reference node and a different node.

In operation 311, the reference node either transmits a bit value through the transmission/reception unit 250 or senses through the sensor unit 220 whether or not there is a bit value received from a different node, according to each place value of the bit string of the reference node itself. That is, the reference node may transmit a 1-bit value, which is short, through the transmission/reception unit 250 if the bit value of a corresponding place value of the bit string of the reference node itself is "1", and the reference node may sense through the sensor unit 220 whether there is received data (i.e., a bit value received from a different node) if the bit value of a corresponding place value thereof is "0".

In operation 321, the reference node preoccupies the media by using the bit string, and transmits a control packet to a child node. In this case, the reference node, which has already received an RTS packet, transmits a CTS packet to the child node. Then, the child node determines a communication time to communicate with the reference node and transmits an ACK packet to the reference node.

In operation 331, a different child node, which is located at a level equal to that of the reference node and has sensed the transmission or reception of the control packet between the reference node and the child node through a sensor unit 220, determines through a control unit 230 that the different child node has not yet performed communication scheduling with the reference node, and notifies the reference node of this. That is, the different child node, which is located at a level equal to that of the child node and has sensed the transmission of the CTS packet, may transmit a WTS packet to the reference node through a transmission/reception unit 250, thereby notifying the reference node that the different child node has not yet performed communication scheduling with the reference node.

After a plurality of child nodes of the reference node have all completed the communication scheduling with the reference, node, the reference node selects a communication time by using the scheduling unit 240 and performs the communication scheduling between the reference node and its parent node (operation 341). In this case, it is preferred, but not necessary, that the reference node selects a communication time capable of minimizing a transmission delay of a data packet, which includes information collected by the reference node, and performs communication scheduling with its parent node.

An example of the communication scheduling method will be described later in detail with reference to FIGS. 6A and 7D.

Figure 4:
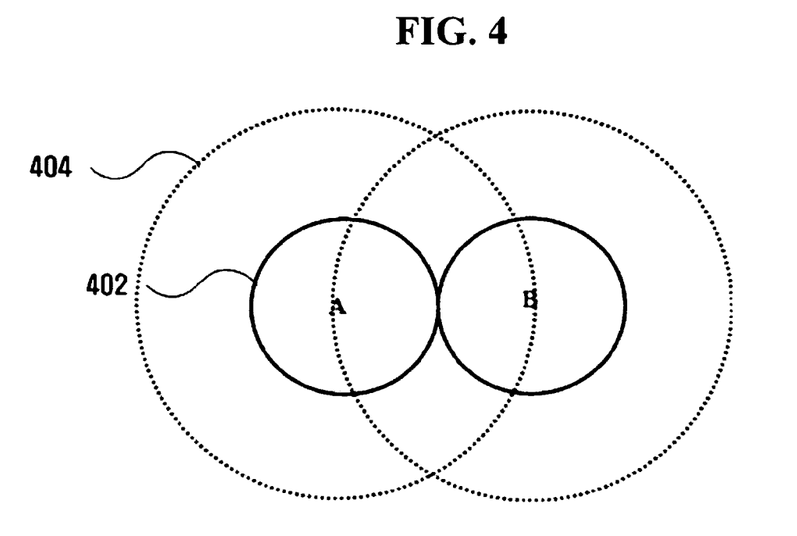
FIG. 4 is a conceptual view of CSMA/IC.

FIG. 4 is a conceptual view of CSMA/IC.

According to the CSMA/IC, a sensing range of a node may be two or more times larger than a communication range of the node. Nodes A and B cannot communicate with each other because each of them is outside of the communication range 402 of the counterpart. However, since the sensing ranges 404 of the nodes A and B are twice as large as the communication ranges 402, they can sense whether or not a packet is transmitted or received between neighboring nodes. That is, when the node B, which is located within the sensing range of the node A but outside of the communication range of the node A, transmits a packet, the node A is able to sense that a node is using the media at the current time although not able to recognize the contents of the transmitted packet. A more detailed description of the CSMA/IC is disclosed in "A New Class of Collision-free MAC Protocol for Ad Hoc Wireless Networks; T. You, C-H. Yeh and H. S. Hassanein".

Figure 5:
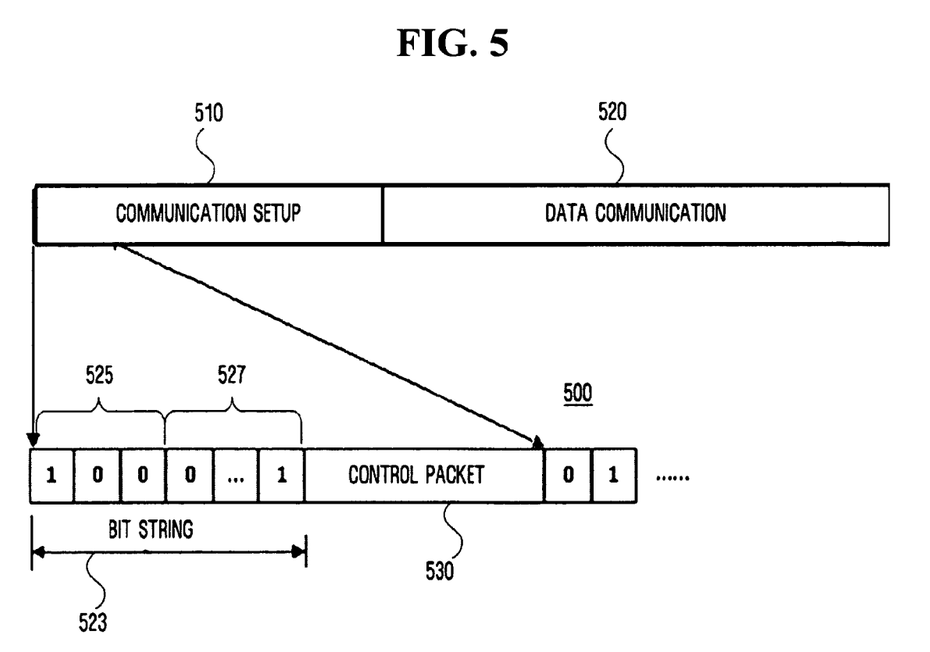
FIG. 5 is a view illustrating the structure of a data frame transmitted between nodes according to an exemplary embodiment of the present invention.

FIG. 5 is a view illustrating the structure of a data frame transmitted between nodes according to an exemplary embodiment of the present invention.

A communication section for transmitting a data frame 500 may be constructed with a communication setup section 510 and a data communication section 520.

First, a communication time to be used for the data communication section 520 may be set up in the communication setup section 510, and in detail, may be set up in a control packet 530 of the communication setup section 510. In this case, the communication setup section 510 may use a bit string 523 in order to occupy the media before transmission of the control packet 530.

The bit string 523 may be constructed by concatenating a bit value 525 allocated according to control packets to be transmitted by a reference node and a bit value 527 representing a specific address of the reference node.

In this case, a bit value allocated according to each control packet may represent the priority of the corresponding control packet, and it is preferred, but not necessary, that the MAC address is used as the specific address of the reference node. That is, the construction unit 210 may allocate a bit value of "001" to an RTS packet, a bit value of "010" to a CTS packet, a bit value of "011" to a WTS packet, and a bit value of "100" to an ACK packet so that a higher bit value can have a higher priority. Through such priority allocation, it is possible to rapidly complete communication scheduling between the reference node and a different node.

The reference node may transmit a 1-bit value, which is short, when the bit value of a corresponding place value of the bit string of the reference node is "1", and the reference node may sense only whether there is received data while being in a waiting state if the bit value of a corresponding place value thereof is "0". Also, the reference node can preoccupy the media to transmit or receive a control packet by using the bit string.

For example, it can be assumed that a value allocated to a control packet of the reference node and the MAC address thereof are concatenated to form a bit string of "0110001", and a bit string of node A adjacent to the reference node is "0100011". In this case, first to third place values of each bit string represent a control packet, and the remaining place values thereof represent an MAC address of each corresponding node. In the two bit strings, since both of the first place values of the reference node and node A are "0", the reference node and node A sense only whether or not there are received data while being in a waiting state. Then, since both of the second place values of the two bit strings are "1", each of the reference node and node A transmits a 1-bit value.

However, since the third place value the bit string of the reference node is "1" while the third place value the bit string of the node A is "0", the reference node preoccupies the media and transmits its own ACK packet corresponding to "011", and the node A does not compete with the reference node for the preoccupation of the media and enters a waiting state. That is, the reference node competes with a different node for the preoccupation of the media according to the above-mentioned principle whenever the reference node tries to transmit a control packet.

Also, the MAC address may be used for the reference node to preoccupy the media for transmission of a control packet. That is, when bit strings of the reference node and node A adjacent to the reference node are constructed with "01110001" and "01100011", respectively, fourth values of the two bit strings, each of which is a value of a MAC address, are "1" in the case of the reference node and "0" in the case of the node A, so that the reference node can preoccupy the media and transmit its own control packet 530.

Also, the construction unit 210 may establish time slot numbers for a communication time, at which a reference node and a different node can communicate with each other, and insert the time slot numbers into a control packet. For example, when the entire data communication time is 100 msec and a unit time is 10 msec, a total of 10 time slots can be constructed. In this case, the construction unit 210 may sequentially allocate a plurality of time slot numbers to the time slots according to time sections, in such a manner that slot No. 1 is allocated to a time slot of 1 to 10 msec, slot No. 2 is allocated to a time slot of 11 to 20 msec, slot No. 3 is allocated to a time slot of 21 to 30 msec, etc. The time slot numbers representing a communication time between a reference node and a different node may be included in the control packets 530, i.e., in the RTS, CTS, and ACK packets.

The communication scheduling using the data frame 500 will now be described in more detail with reference to FIGS. 6A to 7D.

Figure 6A:
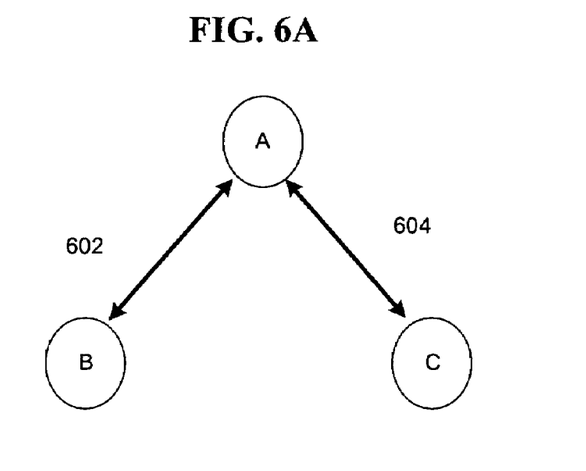
FIGS. 6A to 6C are conceptual views illustrating communication scheduling according to an exemplary embodiment of the present invention.
Figure 6B:
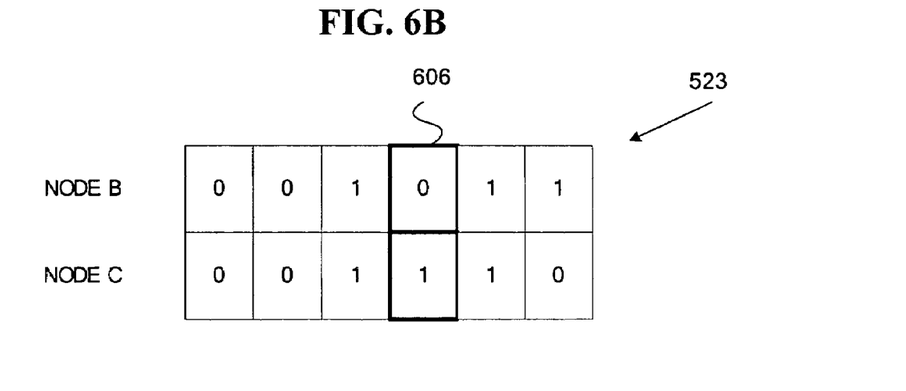
Figure 6C:
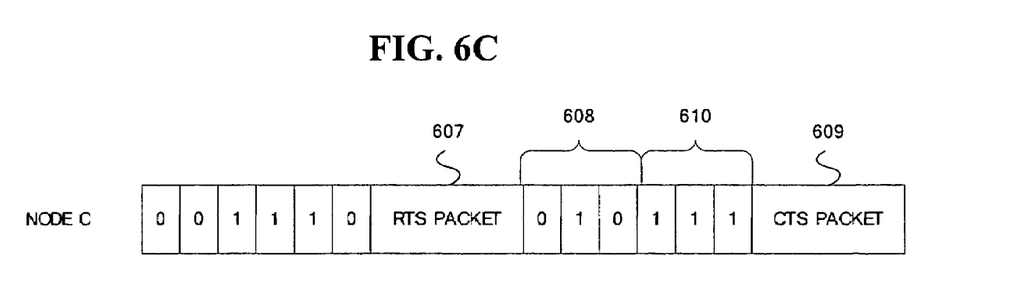

FIGS. 6A to 6C are conceptual views illustrating communication scheduling according to an exemplary embodiment of the present invention.

FIG. 6A shows node A which is a reference node, and nodes B and C which try to perform communication scheduling with the node A. According to a communication scheduling procedure between the nodes A and B, the node B transmits an RTS packet to the node A, the node A transmits a CTS packet to the node B in response to the reception of the RTS packet, and then the node B transmits an ACK packet to the node A, thereby notifying the node A that the communication scheduling has been determined (operation 602). According to a communication scheduling procedure between the nodes A and C, the node C transmits an RTS packet to the node A, the node A transmits a CTS packet to the node C in response to the reception of the RTS packet, and then the node C transmits an ACK packet to the node A, thereby notifying the node A that the communication scheduling has been established (operation 604).

Any one of the communication scheduling procedures (operations 602 and 604), which are performed between the nodes A and B and between the nodes A and C, may be performed first. That is, after sensor nodes have been deployed, the nodes B and C compete with each other for performing communication scheduling with the node A. In other words, the nodes B and C compete with each other for the preoccupation of the media before transmitting a control packet. To this end, the nodes B and C create bit strings 523 for competition with each other.

For example, as shown in FIG. 6B, when an RTS packet corresponds to a bit sequence of "001" and the node B has a MAC address of a bit sequence "011", the node B creates a bit string 523 of "001011". In this case, since the node C has a MAC address of a bit sequence "110", the node C creates a bit string 523 of "001110". By using the created bit strings, the nodes B and C compete with each other for the preoccupation of the media.

First, since the first and second bits in the bit strings of the nodes B and C have a value of "0", the nodes B and C do not transmit a control packet and are in a waiting state while sensing whether or not a different data value is received. Then, since third bits in the bit string of the nodes B and C have a value of "1", the node B and C can transmit a 1-bit value. Since a fourth bit in the bit string of the node B has a value of "0" and a fourth bit in the bit string of the node C has a value of "1", the node B is in a waiting state while performing a sensing operation and the node C transmits a 1-bit value. In this case, the node B senses the 1-bit value, which has been transmitted by the node C based on the fourth place value of the bit string, and then the node B does not participate in the competition for the preoccupation of the media and is in a waiting state. That is, although a fifth bit in the string of the node B has a value of "1", the node B is maintained in the waiting state after the fifth bit because the node has already received the 1-bit value at the time section of the fourth bit thereof.

Thereafter, as shown in FIG. 6C, the node C having preoccupied the media transmits an RTS packet 607 to the node A, and the node A transmits a CTS packet 609 to the node C in response to the RTS packet 607. Even in a procedure in which the node A transmits the CTS packet 609 in response to the RTS packet, the node A is first subjected to a procedure for preoccupying the media. That is, the node A preoccupies the media by using a bit string obtained by concatenating a bit sequence 608 allocated to the CTS packet 609 and a bit sequence 610 representing a MAC address of the node A based on the above-mentioned principle described with reference to FIG. 6B, and then can transmit the CTS packet 609 to the node C in a section for the control packet.

In this case, each of the control packets (i.e., RTS and CTS packets) may include a time slot number that represents a communication time to be usable in an actual data communication section between the nodes C and A. For example, the RTS packet 607 transmitted from the node C to the node A may include time slot numbers "2" and "3" to be usable for data communication, and the node A having received the RTS packet 607 may transmit the CTS packet 606 including time slot numbers "3" and "4" when time slot numbers to be usable by the node A are "3" and "4". Thereafter, the node C compares the time slot numbers which the node C itself can use in a data communication time, with the time slot numbers which the node A can use, and then extracts time slot number "3" to be usable in common by the nodes A and C. Then, the node C transmits an ACK packet to the node A, thereby completing the communication scheduling. In this case, if there are a plurality of time slot numbers (e.g., "3" and "4") to be usable in common by the nodes A and C, it is preferred, but not necessary, that the node C selects one time slot number (i.e., "3") which can minimize a transmission delay in transmission of a data packet which includes information collected by the node C.

FIGS. 7A to 7D are views illustrating communication scheduling among a plurality of nodes according to an exemplary embodiment of the present invention.

Figure 7A:
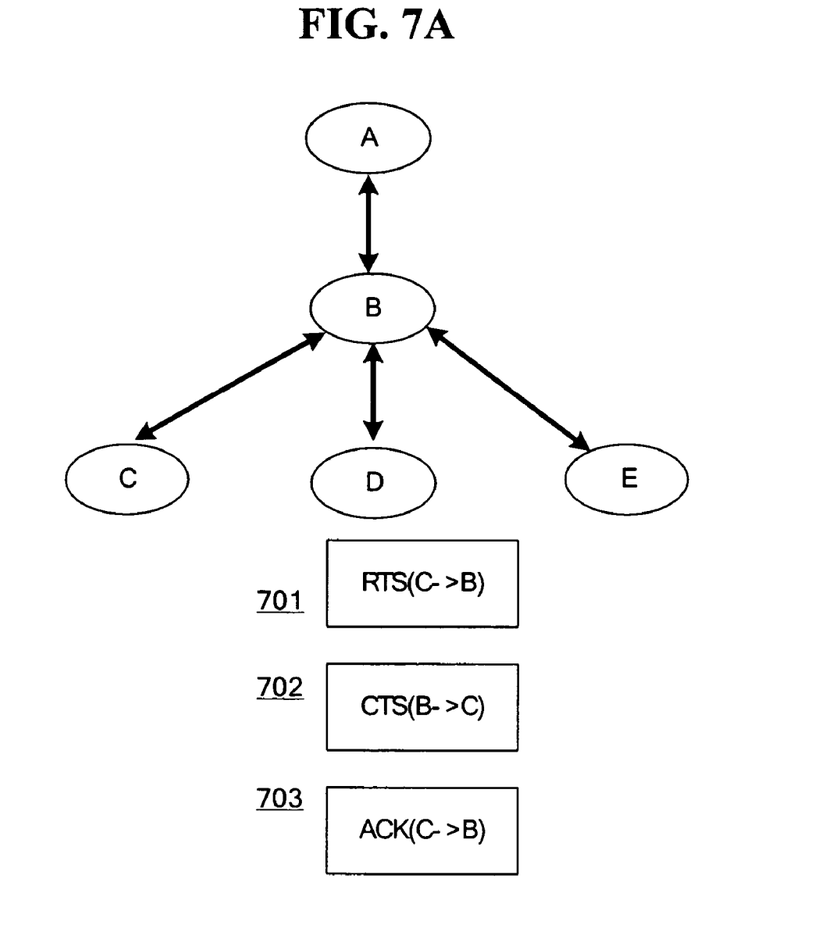
FIGS. 7A to 7D are views illustrating communication scheduling among a plurality of nodes according to an exemplary embodiment of the present invention.

As shown in FIG. 7A, node B, which is a reference node, and node C transmit or receive a plurality of control packets in sequence by using the above-mentioned principle, thereby performing communication scheduling. That is, the node C, which has preoccupied the media by using a bit string, transmits an RTS packet to the node B (operation 701), and the node B transmits a CTS packet to the node C after preoccupying the media (operations 702). Thereafter, the node C extracts a communication time which can be used in common by the nodes B and C, and transmits an ACK packet to the node B (operation 703). In this case, priorities of control packets have been set in a sequence of "RTS (001)<CTS (010)<WTS (011)<ACK (100)" by allocating a higher bit value to a higher priority, and are included in a bit string. As a result, it is possible to rapidly complete communication scheduling between a reference node having preoccupied the media based on its priority and a child node thereof.

Figure 7B:
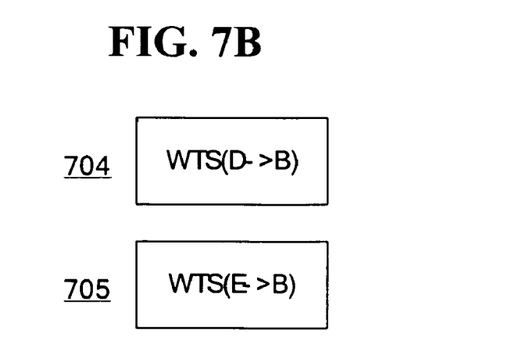

Then, nodes D and E, which are located at a level equal to the node C, senses the CTS packet transmitted by the node B, so that each of the nodes D and E transmits a WTS packet to the node B, thereby notifying the node B that the node D or E has not completed communication scheduling with the node B, as shown in FIG. 7B (operations 704 and 705).

Figure 7C:
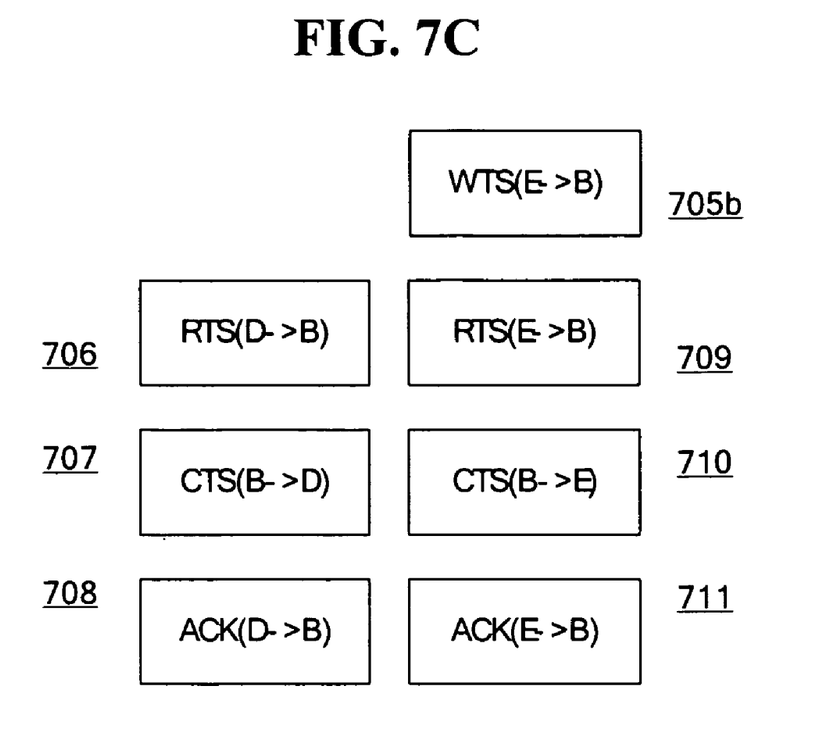

When the node B, which determines if it has determined communication scheduling with every lower node thereof, receives the WTS packets, the node B determines that it has not yet determined communication scheduling with the nodes D and E. Then, the node B performs communication scheduling procedures with the nodes D and E according to the principle described with reference to operations 701 to 703, as shown in FIG. 7C (operations 706, 707, 708, 705*b*, 709, 710, and 711). In this case, since the node E senses a CTS packet transmitted from the node B to the node D, the node E again transmits a WTS packet to the node B, thereby notifying the node B that communication scheduling has not been performed between the node B and the node E (operation 705*b*).

Figure 7D:
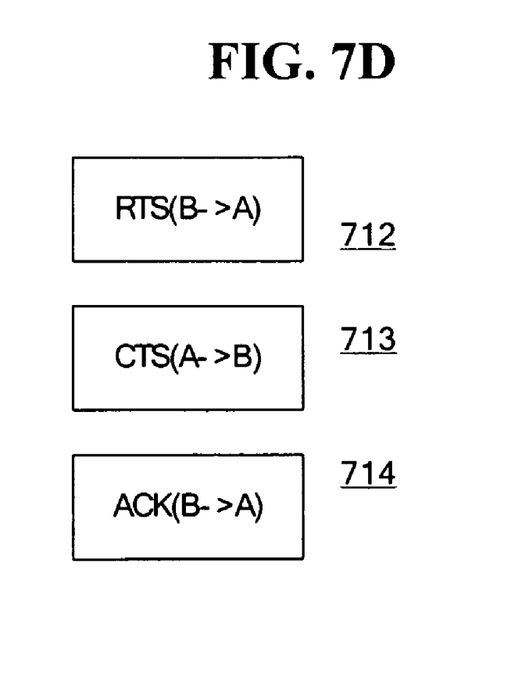

Thereafter, when the node B has completed communication scheduling with every child node thereof, the node B selects a communication time and performs communication scheduling with node A which is a parent node of the node B, as shown in FIG. 7D. In this case, it is preferred, but not necessary, that the node B extracts and selects a communication time which can minimize a transmission delay in transmission of a data packet including information collected by the node B. For example, when the node B has determined communication scheduling with the nodes C, D, and E using time slot numbers "1", "2", and "3", respectively, the node B may insert other time slot numbers (e.g., "4", "5", and "6") available for communication into an RTS packet and transmits the RTS packet to the node A (operation 712). Then, the node A inserts time slot numbers (e.g., "4" and '5") available by the node A itself into a CTS packet and transmits the CTS packet to the node B (operation 713). Next, the node B selects a time slot number (i.e., "4") capable of minimizing a transmission delay of a data packet from among time slot numbers which can be used in common by the nodes A and B, and transmits an ACK packet including the selected time slot number to the node A (operation 714), thereby completing communication scheduling with the node A. The data packet may include various pieces of information, such as temperature, electromagnetic waves, pollution level, location, topography, and objects, which have been collected by the nodes B, C, D, and E in the area. The node B may transmit the data packet to the node A at a communication time corresponding to the time slot number "4".

Figure 8A:
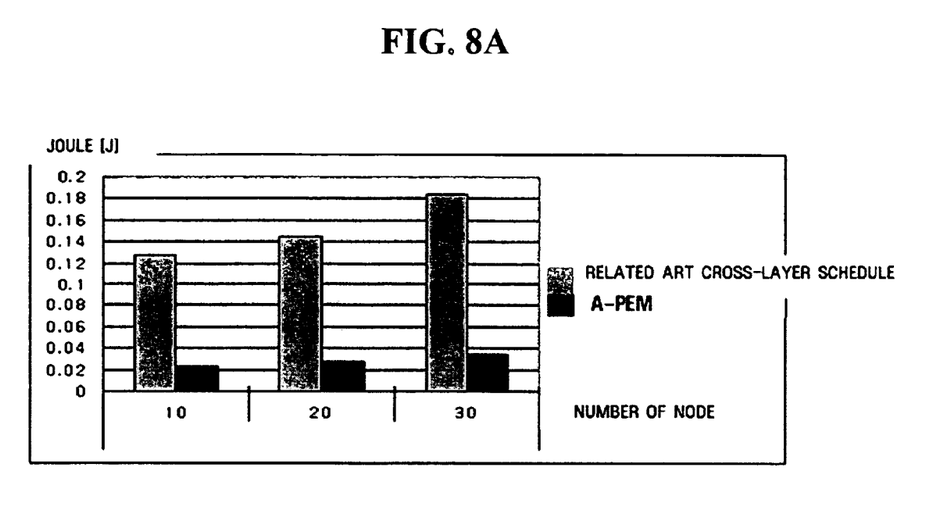
FIGS. 8A to 8C are views illustrating simulation results according to an exemplary embodiment of the present invention.
Figure 8B:
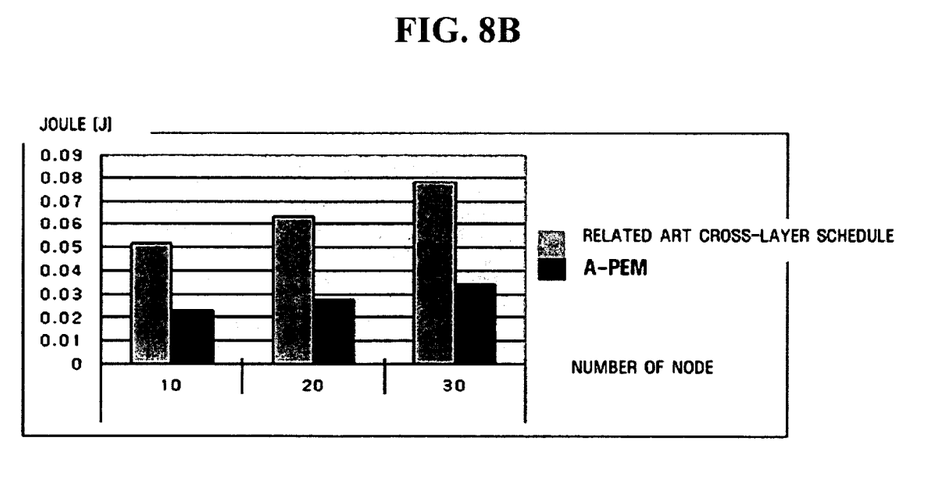
Figure 8C:
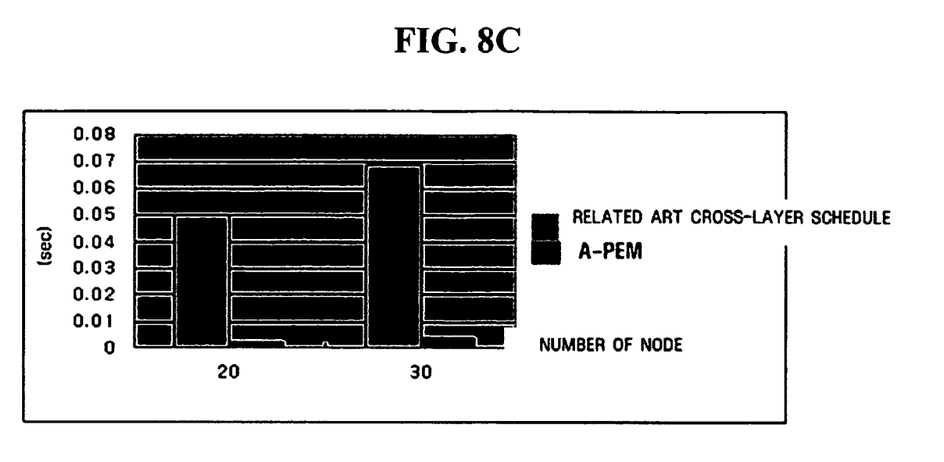

FIGS. 8A to 8C are views illustrating simulation results according to an exemplary embodiment of the present invention.

The simulations according to the present invention were conducted in which Network Simulator Version 2 (NS-2) was used as a simulation tool, and the size of a control packet which can be transmitted through one time slot was limited to 12 bytes. Also, one sensor node used 0.66 W for transmitting one control packet, and consumed 0.395 W for receiving one control packet. The size of a sensor field was set to 653 m×653 m, and CSMA/IC was used. Also, a communication range was set to 200 m, and a sensing range was limited to 400 m. However, a related art cross-layer scheduling, which was an object of comparison, used CSMA. Also, the simulations were conducted by expanding a sensing range of CSMA from 200 m to 400 m. First, mean power consumptions used for performing communication scheduling were compared while increasing the number of nodes from 10, to 20, and to 30. The protocol proposed by the exemplary embodiments of the present invention is named "Aggregation-Power Efficient MAC protocol (A-PEM)".

Referring to FIG. 8A, it can be understood that the A-PEM consumes much less power than the related art cross-layer scheduling.

In order to check if the decrease in power consumption was caused by the usage of CSMA/IC, another simulation was conducted in which the sensing range of the related art cross-layer scheduling, which was the object of comparison, was expanded twofold so as to be equal to that of the CSMA/IC. As a result, as shown in FIG. 8B, it could be determined that the A-PEM consumes about half as much power as the related art cross-layer scheduling.

FIG. 8C shows an improved degree in a transmission delay of a packet, which is a problem in the related art cross-layer scheduling. The related art cross-layer scheduling increases the transmission delay of a packet in a communication time setup operation, because the time point when the RTS packet was lost cannot be used in a section for transmission of an actual control packet. According to the present invention, as shown in FIG. 8C, it can be understood that a transmission delay of a packet was reduced 18 to 20 times as compared with that of the related art cross-layer scheduling.

As described above, the communication scheduling apparatus and method according to the exemplary embodiments of the present invention may have the following effects.

First, it is possible to reduce power consumption due to packet re-transmission.

Secondly, a maintenance cost for the sensor network is reduced, so that it is possible to promote the practicability and popularization of the sensor network.

Although exemplary embodiments of the present invention have been described for illustrative purposes, those skilled in the art will appreciate that various modifications, additions and substitutions are possible, without departing from the scope and spirit of the invention as disclosed in the accompanying claims. Therefore, it should be appreciated that the exemplary embodiments described above are not limiting, but merely illustrative.

What is claimed is:

1. An apparatus for communication scheduling, the apparatus comprising:
  a control unit which determines whether a reference node and a plurality of child nodes of the reference node have completed communication scheduling, which is required for performing communication between the reference node and the plurality of the child nodes during a time period;
  a scheduling unit which performs communication scheduling between the reference node and a parent node of the reference node by selecting a communication time if the control unit determines that the reference node and the plurality of the child nodes have completed the communication scheduling; and
  a sensor unit which senses a control packet if the reference node transmits the control packet to a first child node of the plurality of child nodes, so that a second child node of the plurality of child nodes located at a level equal to that of the first child node of the plurality of child nodes can notify the reference node that the second child node of the plurality of child nodes has not performed the communication scheduling with the reference node,
  wherein the sensor unit senses whether the control packet has been transmitted by using a Carrier Sense Multiple Access/ID Countdown (CSMA/IC) protocol.

2. The apparatus of claim 1, wherein the scheduling unit compares times available for communication between the reference node and the parent node and selects a time available in common in order to perform the communication scheduling between the reference node and the parent node.

3. The apparatus of claim 2, wherein the selected communication time is a time in which a transmission delay of a data packet is minimized, and the data packet comprises information collected by the reference node.

4. The apparatus of claim 1, the apparatus further comprising a construction unit which constructs a bit string to be used for preoccupation of media to transmit a control packet by using at least one of a first bit value and a second bit value, wherein the first bit value is allocated according to control packets used by the reference node for performing the communication scheduling between the reference node and the parent node, and the second bit value represents a specific address of the reference node.

5. The apparatus of claim 4, wherein the first bit value is a value which corresponds to a priority of the control packet.

6. A method of communication scheduling in a wireless sensor network, the method comprising:
  determining, by a reference node, whether the reference node and a plurality of child nodes of the reference node have completed communication scheduling, which is required for performing communication between the reference node and the plurality of the child nodes during a time period;
  performing, by the reference node, communication scheduling between the reference node and a parent node of the reference node by selecting a communication time if it is determined that the reference node and of the plurality of the child nodes have completed the communication scheduling; and
  sensing, by the reference node, a control packet when the reference node transmits the control packet to a first child node of the plurality of child nodes, so that a second child node of the plurality of child nodes located at a level equal to that of the first child node of the plurality of child nodes can notify the reference node that the second child node of the plurality of child nodes has not performed the communication scheduling with the reference node,
  wherein the sensing comprises using a Carrier Sense Multiple Access/ID Countdown (CSMA/IC) protocol to sense whether the control packet has been transmitted.

7. The method of claim 6 further comprising comparing, by the reference node, communication times available for communication between the reference node and the parent node and selecting a communication time available in common in order to perform the communication scheduling between the reference node and the parent node.

8. The method of claim 7, wherein the selected communication time comprises a time in which a transmission delay of a data packet is minimized, and wherein the data packet comprises information collected by the reference node.

9. The method of claim 6 further comprising constructing, by the reference node, a bit string to be used for preoccupation of media to transmit a control packet by using at least one of a first bit value and a second bit value, wherein the first bit value is allocated according to control packets used by the reference node for performing the communication scheduling between the reference node and the parent node, and the second bit value represents a specific address of the reference node.

10. The method of claim 9, wherein the first bit value for the control packet comprises a value allocated according to a priority of the control packet.

* * * * *